US006687732B1

United States Patent
Bector et al.

(10) Patent No.: US 6,687,732 B1
(45) Date of Patent: Feb. 3, 2004

(54) ADAPTIVE TRAFFIC BYPASSING IN AN INTERCEPTING NETWORK DRIVER

(75) Inventors: Rajeev Bector, Mountain View, CA (US); David Gourley, Palo Alto, CA (US); Paul Andre Gauthier, San Mateo, CA (US); Brian Totty, Foster City, CA (US)

(73) Assignee: Inktomi Corporation, San Mateo, CA (US)

( * ) Notice: Subject to any disclaimer, the term of this patent is extended or adjusted under 35 U.S.C. 154(b) by 0 days.

(21) Appl. No.: 09/369,659

(22) Filed: Aug. 5, 1999

Related U.S. Application Data

(60) Provisional application No. 60/102,191, filed on Sep. 28, 1998.

(51) Int. Cl.$^7$ .............................. G06F 15/16
(52) U.S. Cl. ............... 709/200; 709/200; 709/217; 709/218; 709/224; 709/229; 709/227
(58) Field of Search .................. 709/200, 217, 709/218, 229, 239, 224, 227

(56) References Cited

U.S. PATENT DOCUMENTS

| | | | | |
|---|---|---|---|---|
| 5,611,049 A | | 3/1997 | Pitts | 395/200.09 |
| 5,778,174 A | * | 7/1998 | Cain | 713/201 |
| 5,991,881 A | * | 11/1999 | Conklin et al. | 709/224 |
| 6,006,268 A | * | 12/1999 | Coile et al. | 709/203 |
| 6,085,234 A | | 7/2000 | Pitts et al. | 709/217 |
| 6,098,172 A | * | 8/2000 | Coss et al. | 713/201 |
| 6,173,322 B1 | * | 1/2001 | Hu | 709/217 |
| 6,301,645 B1 | * | 10/2001 | Porterfield | 711/206 |
| 6,304,894 B1 | * | 10/2001 | Nakayama et al. | 709/203 |

* cited by examiner

*Primary Examiner*—Krisna Lim
*Assistant Examiner*—Yasin M Barqadle
(74) *Attorney, Agent, or Firm*—Hickman Palermo Truong & Becker LLP; Edward A. Becker

(57) ABSTRACT

An Internet Protocol driver executed by a network interface card, or a network address translation module, includes a mechanism that enables a server to bypass packets associated with certain destinations, sources, or a combination of the two based upon their IP address. When a packet arrives at the network interface card, the driver extracts a source IP address and a destination IP address from the packet. The driver searches a table to locate a rule matching one of the addresses. If a match is found, the packet is bypassed. If no match is found, the packet is sent on to an indexing and caching server for further processing. The bypass rules may be adaptively and dynamically generated when a message causes a remote server to respond with an error code. The dynamically generated bypass rules prevent the first server from sending subsequent requests to the remote server, thereby insulating the indexing and caching server from unnecessary network traffic.

90 Claims, 5 Drawing Sheets

ADAPTIVE TRAFFIC BYPASSING IN AN INTERCEPTING NETWORK DRIVER

RELATED APPLICATION; PRIORITY CLAIM

This application is related to and claims domestic priority under 35 U.S.C. §119(e) from prior application Ser. No. 60/102,191, filed Sep. 28, 1998, entitled Traffic Bypassing In An Intercepting Network Driver, and naming as inventors Rajeev Bector, David Gourley, Paul Gauthier, and Brian Totty, the entire disclosure of which is hereby incorporated by reference as if fully set forth herein.

FIELD OF THE INVENTION

The present invention generally relates to computer programs. The invention relates more specifically to network devices that receive and respond to requests for electronic documents, and relates particularly to a network interface driver that intercepts, receives, examines, processes, and passes network traffic to various other network-attached devices.

BACKGROUND OF THE INVENTION

1. Client-Server Network System With Proxy Server

FIG. 1 is a simplified block diagram of a client-server network system in which an embodiment may be used. Client 100 is a personal computer, workstation, smartphone, personal digital assistant, interactive television, or other network agent or node that may have the structure illustrated in FIG. 3, which is described below. Client 100 executes Web applications 102, such as Netscape Communicator®, or Microsoft Internet Explorer®. In the system of FIG. 1, there may be any number of clients 100; one client is shown only by way of example.

Client 100 is coupled by a network communication path 104 to an internetwork 106. In the preferred embodiment, the internetwork 106 is the global, packet-switched IP data network, comprised of interconnected IP-aware and/or TCP/IP-aware network devices, now commonly known as the Internet. Portions of the internetwork may be owned and operated by different organizations, who cooperate to provide global data connectivity.

Within the substructure of the internetwork 106 may reside an intercepting routing device 110, such as a router or bridge, which supports Internet packet addressing, and through which packets of information ("network traffic") pass on their way through communication path 108 to one or more origin servers 124 within the internetwork. The term "origin server" is used herein to identify a server as an originating point of delivery for one or more electronic documents that may be of interest to client 100.

The intercepting routing device 110 is directly or indirectly attached to proxy server 114 through communication path 107. The routing device may intercept certain classes of IP and TCP/IP traffic, intended for one or many origin servers, and retarget that traffic for the proxy processing engine 116. The proxy processing engine 116 may then deliver responses to the client requests, or otherwise participate in the representation or transport of the client to origin server transaction. The proxy processing engine 116 may receive electronic documents directly from origin servers (e.g. origin server 124) or indirectly through a local cache store or dynamic content generation engine Proxy server 114 interacts with one or more network interface cards (NICs) 122. Each network interface 122 provides a lowest-level interface of proxy server 114 to network signals arriving from network 106 via routing device 110. For example, each network interface card 122 may be an Ethernet interface card.

Each network interface card 122 is associated with a driver 120, a network protocol stack 118 (for example, TCP/IP), and a proxy processing engine 116. In FIG. 1, these elements are depicted in a logical hierarchy in which network interface card 122 is a lowest logical level and proxy processing engine 116 is at the highest logical level.

The driver 120 is a software element executed on or in close association with a network interface card 122. The driver 120 is responsible for, among other things, examining each packet of information that arrives from internetwork 106 to determine its source, destination and the type of request or other message that it contains.

Using conventional techniques, driver 120 is typically responsible for receiving intercepted traffic, making it ready for local processing, and dispatching the traffic to a local proxy processing engine 116.

For example, assume that client 100 has an IP address of "100", proxy server 114 has an IP address of "114", and origin server 124 has an IP address of "124". Assume further that the client and the servers work with electronic documents that are requested and delivered using Hypertext Transfer Protocol (HTTP). To enable the proxy server 114 to intercept requests and deliver results from a cache, the intercepting router 110 is pre-configured to intercept requests for electronic documents, and forward these requests to proxy server 114, regardless of the actual location of an original copy of the electronic document.

Now assume that the client 100 requests a particular document. The client's request message contains information, encoded according to IP, TCP, and HTTP, "Source=100," "Destination=114," "Destination Port=80. " The proxy server 114 knows that the requested electronic document is really located on origin server 124. In past approaches, the driver 120 would translate the destination address from "114" to "124", translate the destination port value from "80" to "8080", and pass the packet logically upward for processing by the proxy processing engine 116. If the proxy processing engine 116 needs to obtain a copy of the electronic document from the origin server 124, the proxy server sends an appropriate request, but the request identifies the IP address of the proxy server 114, not the client 100.

The IP stack 118 is responsible for extracting and processing Internet Protocol information embedded in packets of information that arrive from network 106.

In the preferred embodiment, proxy processing engine 116 is an instance of the TrafficServer™ brand proxy server, release 1.1.6 or later, commercially available from Inktomi Corporation of San Mateo, Calif.

2. Deficiencies of Past Approaches

Simple proxy interception approaches have several drawbacks, including problems related to:

transparent handling of out of spec traffic transparent handling of unknown protocols semantic changes caused by the presence of transparent proxies overload handling fault tolerance malicious attacks client or server logic errors client and server preferences not to be intercepted unnecessary resource consumption for tunneled traffic Each of the problems identified above shall now be described in greater detail.

With respect to handling "out-of-spec" traffic, it has been discovered that traffic interception schemes may intercept incorrectly implemented traffic flows, or traffic flows in an older or newer revision of the protocol, that may be sufficient for some origin servers, but not for the target of the interception, such as the proxy server. For example, a network device configured to intercept TCP port 80 HTTP traffic, and send it to a proxy server, may end up sending unofficial extensions to HTTP, or incorrect HTTP. While those HTTP extensions may be supported by a special version of an origin server, they may not be supported by a general proxy server. The intercepting proxy may then yield different or erroneous results as compared to the origin server due to out-of-spec traffic.

With respect to transparent handling of unknown protocols, interception network devices commonly use heuristics to identify the composition of traffic flows. For example, historically, TCP port 80 has been generally reserved and exclusively used for HTTP network traffic. Relying on this standard, an interception network device intercepts all port 80 traffic and redirects this traffic to a local server, such as a proxy server. However, there is no ubiquitous enforcement ensuring that all traffic carried by port 80 is HTTP. For example, because some networks have firewalls that only permit the exchange of port 80 data, some users have been induced to embed non-HTTP traffic (such as networked computer game traffic) into port 80, to circumvent filtering policies. As a result, non-HTTP traffic on port 80 arrives at an interception network device, and is redirected automatically to the proxy processing engine 116. Because the proxy server likely is expecting HTTP traffic, it responds with an error condition and closes the current connection. From the client's point of view, the end server appears to stop working correctly.

Another problem involves the obscuration of IP identity through proxies. As a result of traffic interception and the presence of the proxy server 114, when the client's forwarded request reaches the origin server 124, the origin server typically receives the IP address of the proxy server, and not the IP address of the client 100. If the origin server uses the client IP address for access control to the documents, the request may be refused, or the response content may be generated specially for the wrong IP address, because the proxy is obscuring the true address of the client. Furthermore, the proxy cannot in general masquerade as the IP address of the client because the return path of IP traffic must be directed back through the proxy.

Still another problem is caused by the redirection target, such as proxy processing engine 116, being unexpectedly overloaded. Because intercepting proxies are central intermediaries, it is important that they not degrade the quality of service.

With respect to client or server logic errors, clients and servers may contain logic errors that do not inter-operate well with intercepting proxies.

Additionally, some clients and servers may explicitly wish to have their traffic not processed by intercepting devices.

Additionally, some types of intercepted transactions may not be relevant for processing by intercepting applications. While the redirection to an intercepting server may yield a correct result, additional resources may be expended without providing value.

SUMMARY OF THE INVENTION

A system, method and mechanism are provided that address the problems enumerated above. In particular, a system, mechanism and method are provided for dynamically determining whether to dispatch traffic to a local proxy server, or to bypass the proxy server to send the traffic to a remote server or to the original target origin server. Various embodiments are provided that can:

recognize packets that carry malformed or out-of-spec protocol traffic, and bypass them to the origin server without transfer to the proxy processing engine;

recognize packets that are presented in a foreign or unprocessable protocol, and bypass them to the origin server without transferring them to the proxy processing engine;

recognize network traffic that cause semantic changes or errors related to IP identification and proxy-based IP address changes, and bypass this traffic directly to the origin server, preserving the client IP address;

detect overloaded redirection targets, and bypass quantities of traffic directly toward origin servers, and away from interception target applications, to prevent overload;

detect known problematic clients or servers, bypass traffic directly toward origin servers, and away from interception target applications;

efficiently maintain distributed lists of clients and servers that wish not to be processed by intercepting applications, bypass this traffic directly toward origin servers, and away from interception target applications; and identify classes of transactions that will not gain value from redirection to intercepting servers, and efficiently bypass this traffic directly toward origin servers, and away from interception target applications.

Further, because intercepting proxies are central intermediaries, and because redirection target applications can fail, a system, method and mechanism are provided that can detect non-functional redirection targets, and bypass traffic directly toward origin servers, and away from interception target applications.

Similarly, because intercepting proxies are central intermediaries, and because malicious clients may be able to construct schemes to interfere with the correct operation of these intermediaries, denying service to all users, a system, method and mechanism are provided that can detect malicious attacks, and bypass traffic directly toward origin servers, and away from interception target applications, to minimize the risk of denial of service attacks.

The foregoing needs, and other needs that will become apparent from the following description, are addressed by the systems, methods and methods that are described in this disclosure.

BRIEF DESCRIPTION OF DRAWINGS

Embodiments are illustrated by way of example in the drawing figures, in which like reference numbers indicate like elements, and in which.

DETAILED DESCRIPTION

A method and apparatus for bypassing network traffic is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview

In general, a method is disclosed to identify network traffic that should not be processed by an intercepting proxy server, to instruct the system to bypass such network traffic and not to pass such network traffic to the proxy server. Instead, the driver passes the network traffic to the destination identified in the network traffic.

The network traffic comprises one or more packets. In one embodiment, each packet contains an IP header that identifies a source IP address and a destination IP address. Each packet also contains a TCP header that identifies a port identifier value. In this context, to "bypass" a packet means to forward the packet directly to its destination rather than passing it through the proxy server Although the methods and mechanisms disclosed herein are preferably implemented within an Internet Protocol Network Address Translation driver, this context is merely exemplary, and is not required. The methods and mechanisms may be implemented within or as a part of any structure or element that is interposed logically between a client and a server, so that network traffic or similar information may be routed around or may selectively bypass the second server, upon conditions detected by the methods or mechanisms.

Traffic Bypassing Mechanisms

Figure 2A:
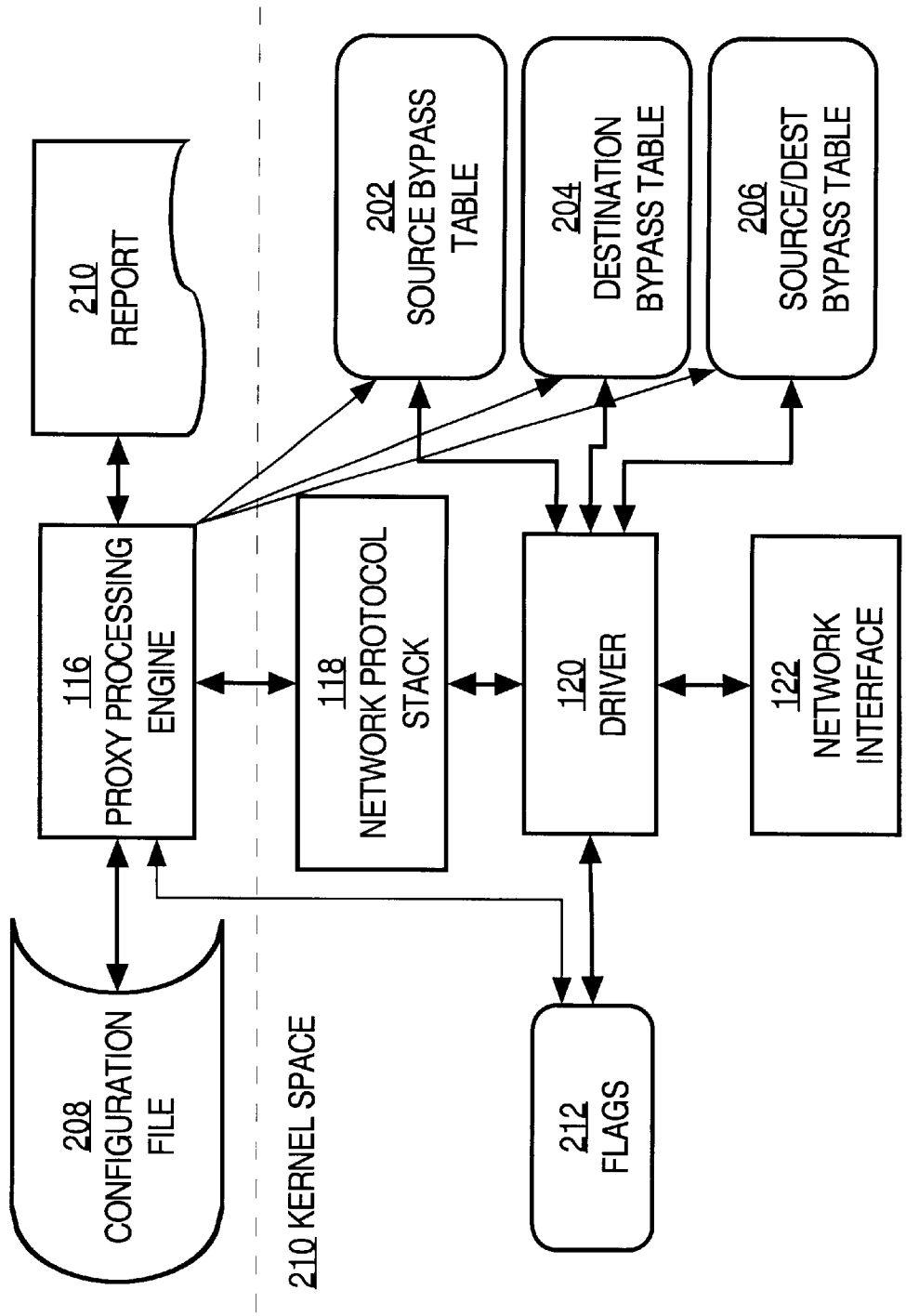
FIG. 2A illustrates an embodiment of a mechanism that may be used to implement a method of bypassing network traffic.

FIG. 2A illustrates an embodiment of a mechanism that may be used to implement a method of bypassing network traffic.

Figure 1:
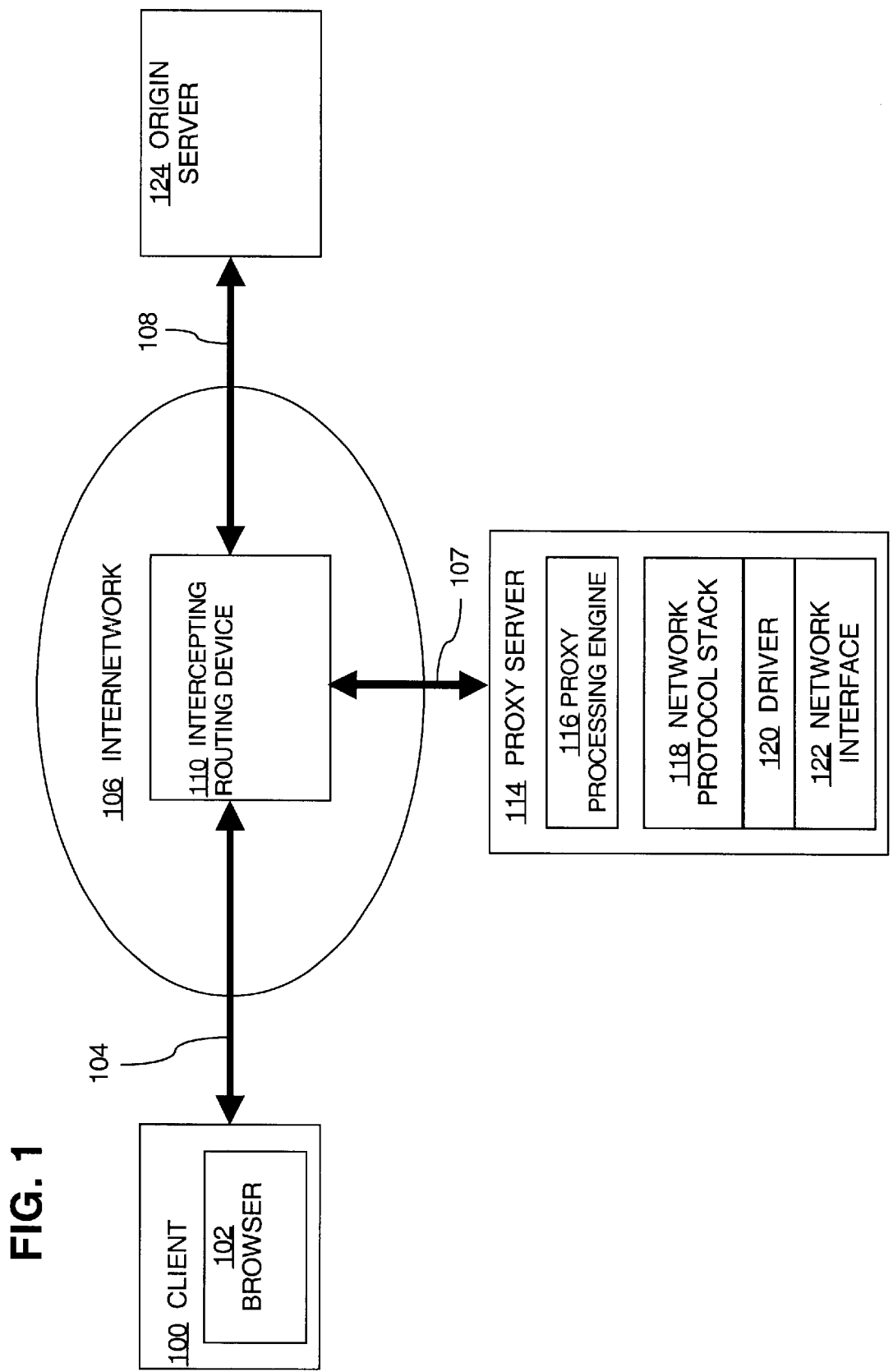
FIG. 1 is a simplified block diagram of a client-server network system in which an embodiment may be used.

Generally, NIC 122, driver 120, IP stack 118, and proxy processing engine 116 are arranged in the configuration shown in FIG. 1. Additionally, the driver 120 contains data structures and control points to control the bypassing of traffic. In the preferred embodiment, traffic can be bypassed based on instantaneous as well as historic observations, and the bypass policies can be established manually or adaptively.

For the purpose of this application, the principal functions of the driver 120 include:

1. The ability to receive and detect intercepted network traffic, originally intended for third-party origin servers, but delivered by intercepting network devices to the node hosting the driver.
2. The ability to appropriately convert the formats of intercepted traffic streams into packets that are specifically meaningful within the local systems and servers where the intercepted traffic is to be retargeted. For example, the driver may receive intercepted traffic through an IP tunnel, where each intercepted packet is encapsulated by the intercepting routing device inside another IP packet. The driver can remove the encapsulation to retrieve the original packet.
3. Additionally, the driver can appropriately convert or translate the source or destination addresses of each packet of intercepted traffic into addresses that are specifically meaningful within the local systems and servers of the network service provider. When the system operates in an Internet Protocol (IP) network, this function is called IP Network Address Translation ("IP NAT") and therefore driver 120 may be called an "IPNAT driver".
4. The driver can decide to forward the intercepted traffic to an application residing on the node hosting the driver, based on policies related to performance, load, traffic composition, operational readiness, access control, and other decision criteria.
5. The driver can decide to forward the intercepted traffic to an application residing a remote node, based on policies related to performance, load, traffic composition, operational readiness, access control, and other decision criteria.
6. The driver can decide to forward the intercepted traffic directly back to the originally targeted origin based on policies related to performance, load, traffic composition, operational readiness, access control, and other decision criteria.

In the preferred embodiment, the driver 120 first examines a set of bypass tables that specify which clients and/or servers have been previously determined to require bypass. These tables are created both by manual configuration and through automated adaptive learning.

Additionally, in the preferred embodiment, the driver examines features of the current transaction and environment to determine if the transaction should be bypassed, even if the transaction does not register with the current bypass tables.

Bypass Tables

The bypass tables allow particular clients, particular servers, or particular communicating (client, server) pairs to have their traffic bypassed. In the preferred embodiment, a source bypass table 202, a destination bypass table 204, and a source-and-destination bypass table 206 are stored in association with driver 120.

Each bypass table 202, 204, 206 is a list of one or more "bypass rules" that identify classes of network traffic to be ignored. The bypass rules may be created a priori, or be self-generated adaptively as conditions evolve.

Although the term "table" is used in this document for convenience, alternatively each table 202, 204, 206 may be structured as a linked list or other data structure that facilitates rapid lookup. Each table 202, 204, 206 is ordered. For example, a binary tree structure may be used. Each IP address value may be stored in each table in the form of a 32-bit integer, to facilitate rapid processing by a host computer that can carry out 32-bit arithmetic operations.

Each bypass rule has an associated time-to-live (TTL) value. The TTL specifies how long each bypass rule is valid. When the time-to-live expires, the bypass rule is removed. This allows transient conditions to be bypassed for a specified period of time.

The source bypass table 202 is a list of bypass rules that identify traffic to be bypassed when they appear as the source IP address value in a packet that is received at the driver 120. The source bypass table 202 may be useful to cause driver 120 to bypass clients that wish to opt out of an intercepting proxy system, or that commonly send malformed, unsupported, erroneous, or malicious traffic.

The destination bypass table 204 is a list of bypass rules that identify traffic that is to be bypassed when they appear as the destination IP address value of a packet that is received at driver 120. The destination bypass table 204 may be useful to cause driver 120 to bypass destination servers that wish to opt out of an intercepting proxy system, that commonly send malformed, unsupported, erroneous, or malicious traffic, or that validate the IP address of the client.

The source-and-destination bypass table 206 also is a list of bypass rules. When the source IP address and the destination IP address of a packet both appear in the source-and-destination bypass table 206, the packet is to be bypassed. The source-and-destination bypass table 206 may be useful in bypassing traffic around specific client/server address pairs that incur problems with IP address validation or unsupported peer protocol traffic. This method may be preferable to using a client or destination bypass method alone, because failure modes often occur for only specific client-server communications, and bypassing all requests to a particular server or client would bypass unnecessarily large quantities of traffic.

Static and Adaptive Bypass

Values stored in the bypass tables may be established by storing one or more bypass rules in a configuration file 208 that is stored in association with proxy processing engine 116. The syntax and use of the rules are described elsewhere herein. In one embodiment, the proxy processing engine 116 reads the rules stored in the configuration file 208 when the proxy server initializes or is re-started. The proxy processing engine 116 builds the contents of tables 202, 204, 206 based on the rules in the configuration file 208. This is called "static bypassing."

Alternatively, the proxy processing engine 116 self-generates bypass rules as it receives packets in unsupported protocols that cannot be handled by the proxy server, when it communicates with servers that report certain error messages, when a malicious attack is suspected, and when persistent failures are detected.

For example, the proxy processing engine 116 generates rules when it cannot parse an intercepted port 80 request as HTTP; when a client-IP authentication failure occurs at an origin server; and when certain other failures or errors occur. An authentication failure, and other failures or errors, are detected when a return message from the origin server contains an HTTP error code such as "403," "404," and others as described elsewhere in this disclosure. In response to an error code, the proxy processing engine 116 generates a bypass rule that contains the source IP address and the destination IP address of an HTTP request or message that caused the error. The rule is stored in the source-and-destination bypass table 206. This is called "dynamic bypassing."

Controls

Proxy processing engine 116 may generate a report 210 or other output that describes the contents of tables 202, 204, 206. In one embodiment, proxy processing engine 116 responds to a "print" command by generating a report of the contents of the tables 202, 204, 206, expressed in the form of one or more bypass rules. In the preferred embodiment, the report 210 may be used as configuration file 208. In this way, rules created during dynamic bypassing may be captured periodically and reviewed. Also, if the proxy processing engine 116 crashes, it may be re-configured statically by copying the contents of the report 210 into configuration file 208, thereby causing the server 116 to load the rules that were gathered dynamically at its next re-start.

A plurality of flags 212 is stored in association with driver 120. There may be one flag associated with each of the standard HTTP error codes. The flags enable driver 120 and proxy processing engine 116 to determine whether dynamic bypassing is to be carried out in response to receiving a particular HTTP error code. For example, among flags 212 there is one flag each associated with the standard HTTP error codes "400" (Bad Request), "403" (Forbidden Resource), "405" (Method not allowed), "406" (Not acceptable [access]), "408" (Request timeout), and "500" (Internal server error). When an HTTP error is identified by proxy processing engine 116, dynamic bypassing is carried out only when the flag associated with the error code of the error has the value "TRUE," or an equivalent value. If the flag associated with the error code of the error has the value "FALSE", or an equivalent value, dynamic bypassing is skipped. This mechanism enables dynamic bypassing to be configured according to the needs of the users of the system.

In one embodiment, the flags 212 are set or cleared by storing a configuration instruction in a configuration file that is read by indexing and caching server 116 when the server initializes. For example, proxy processing engine 116 may have a global configuration file that contains an instruction such as:

CONFIG proxy.config.trans.bypass_on_403 INT 0

When read and processed by proxy processing engine 116, this instruction causes the server 116 to set the flag "proxy.config.trans.bypass_on_403" to the value "0", meaning "on" or "TRUE". Each of the other flags 212 may be set by placing a similar instruction, referencing a different particular HTTP error code, in the global configuration file.

In an alternate embodiment, first and second sets of flags are stored, in which the first set of flags is associated with destination bypassing, and the second set of flags is associated with source-and-destination bypassing. This embodiment allows destination bypassing to be selectively enabled for particular error codes, whereas source-and-destination bypassing may be separately selectively enabled for other error codes.

Software elements associated with the IP stack 118, driver 120, NIC 122, flags 212, and tables 202, 204, 206 may be stored in a kernel space 210 of memory of a host computer. In this configuration, processing by driver 120 and operations with the tables 202, 204, 206 are executed particularly quickly. Further, the elements in kernel space 210 are logically separate from superior elements such as proxy processing engine 116, which improves the robustness of the system by preventing errors occurring in the superior elements from affecting the elements in the kernel space.

Traffic Bypassing Method

Figure 2B:
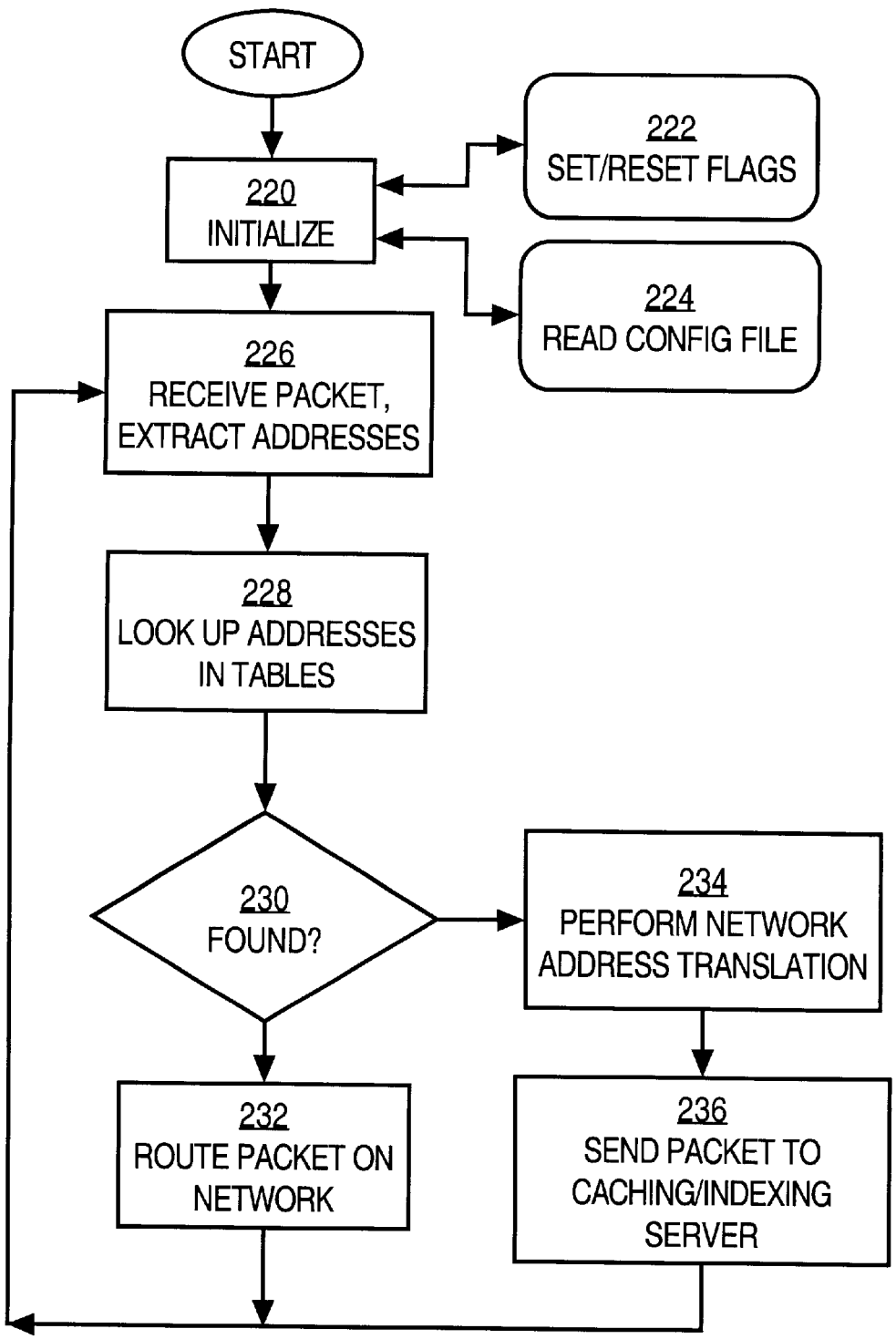
FIG. 2B is a flow diagram of a preferred method of bypassing certain destinations, sources, or a combination of the two based upon their IP addresses.

FIG. 2B is a flow diagram of a preferred method of bypassing certain destinations, sources, or a combination of the two based upon their IP addresses.

In block 220, the process of FIG. 2B is initialized. Block 220 involves establishing and storing the initial contents of one or more bypass tables, such as bypass tables 202, 204, 206. Block 220 also may involve the step of turning on flags that are associated with error codes, as shown by block 222. For example, block 222 may involve selectively setting or clearing one or more of the flags 212. Block 220 also may involve carrying out static bypassing, by reading a configuration file, such as configuration file 208, and storing appropriate values in one or more of the bypass tables.

In block 226, a packet is received. For example, a data packet of an Internet Protocol message may be received at a network interface card. When the packet arrives at the network interface card, a source IP address and a destination IP address are extracted from the packet. The addresses may be extracted by a software element executed by or associated with the network interface card, such as driver 120 or a network address translation module.

In block 228, the addresses are looked up in the bypass tables. In an embodiment, driver 120 carries out three searches. The source bypass table 202 is searched for a value that matches the source IP address of the packet that was received in block 226. The destination bypass table 204 is searched for a value that matches the destination IP address of the packet that was received in block 226. The source-and-destination bypass table 206 is searched for a value that matches the source IP address of the packet and a value that matches the destination IP address of the packet.

In block 230, a determination is made as to whether a matching address value is found in any of the searches. If a match is found in any of the searches, then the packet is routed back out across network 106, as indicated by block 232. The packet is not sent to proxy processing engine 116. Thus, in effect, the packet is bypassed quickly around the proxy processing engine 116, and sent transparently on its way to the origin server 124 with minimal packet modification. Advantageously, this prevents proxy server 114 from serving requests directed to or originating from IP addresses that are known to be sources of errors, thereby reducing traffic load on the proxy server.

If no match is found in the lookup steps of block 228, then control is passed to block 234, in which conventional network address translation is carried out. In block 236, the packet is sent on to the indexing and caching server 116 for further processing.

Transaction Bypassing

Because bypass rules may change dynamically, and because TCP transactions consist of a stateful sequence of packets, one embodiment of the foregoing method applies the bypass logic during TCP connection setup. In this manner, the results of the bypass decision apply consistently to all of the subsequent packets in the TCP session. Either all packets in the TCP session are bypassed, or none of them are. In this manner, when bypass rules change, packets in the middle of a TCP session will not suddenly be bypassed, breaking the connection.

But, because multiple transactions may be sent across a TCP connection, there are situations where it is undesirable for all packets in a TCP session to be uniformly bypassed. For this reason, in one embodiment, bypass decisions are made for each logical transaction in a TCP session. The bypassed transactions are rejoined and resequenced by the driver 120.

Statistical Bypassing

In one embodiment, bypassing decisions are made statistically. When a bypass rule is matched, the final bypass decision involves a stochastic factor called the "bypass percentage" - - - a random percentage of time that a bypass decision takes effect. If the bypass percentage is 100%, all decisions to bypass are acted upon. If the bypass percentage is 0%, no decisions to bypass are acted upon. A continuum exists by which transactions can be statistically bypassed to control traffic.

An improved driver 120 having the foregoing characteristics may be called an "Adaptive Redirection Module" or "ARM".

Dynamic Rule Generation

Figure 2C:
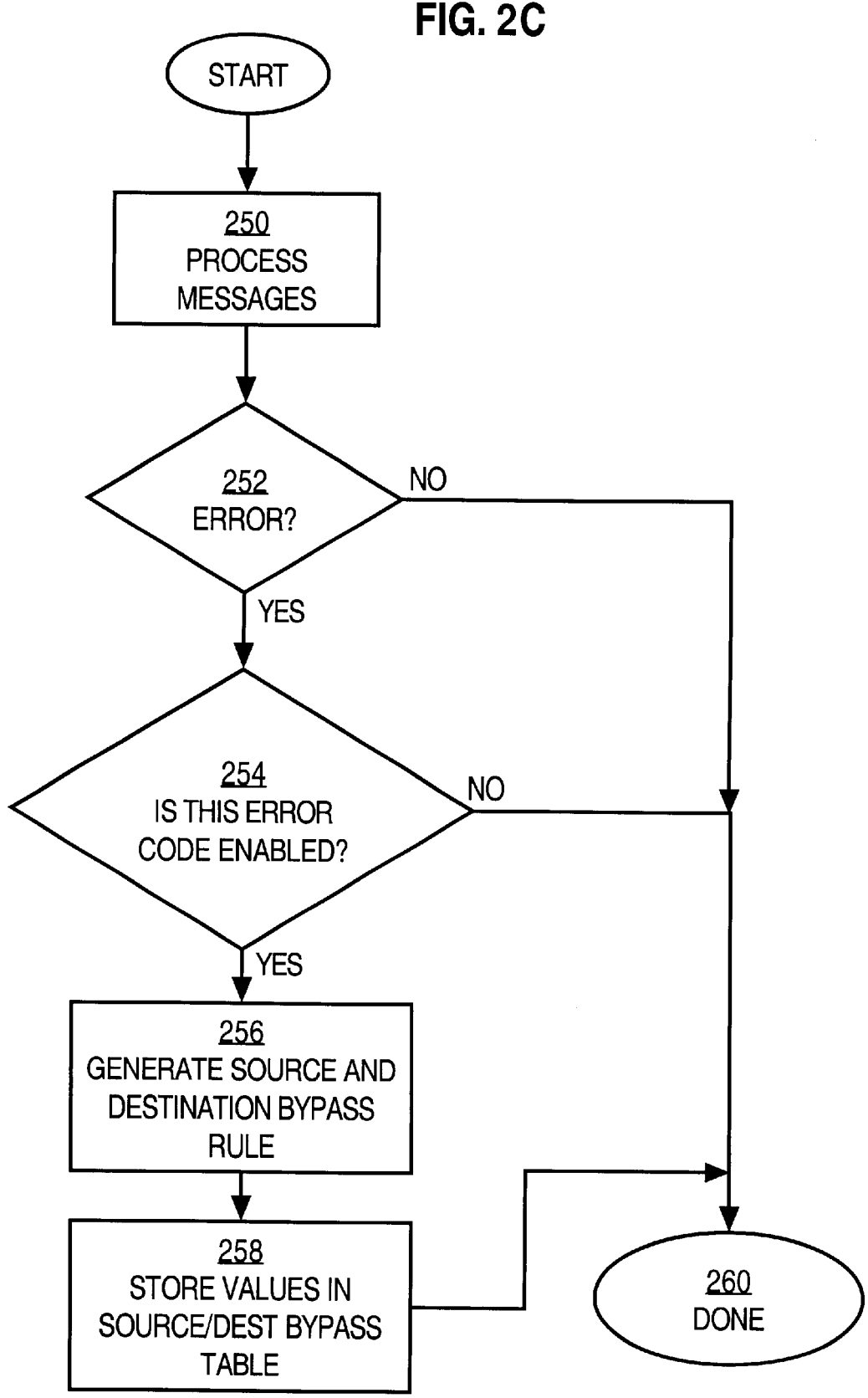
FIG. 2C is a flow diagram of a preferred embodiment of a method of dynamically generating bypass rules.

FIG. 2C is a flow diagram of a preferred embodiment of a method of dynamically generating bypass rules.

In block 250, messages are processed. For example, block 250 may involve proxy processing engine 116 sending an HTTP request message to origin server 124. Alternatively, block 250 may involve proxy processing engine 116 directing proxy server 114 to communicate with a server.

In block 252, the process tests whether a message processed in block 250 generated an error. Block 252 may involve, for example, detecting an HTTP error code in a response message that is received at proxy processing engine 116. If no error message is detected, then control is passed to block 260 in which the process terminates. Block 260 may involve passing control, in a loop, back to block 250. Alternatively, block 260 may involve returning control to a calling program or process.

If an error message is detected in block 252, then in block 254, a determination is made as to whether error processing is active for the error code contained in the message that caused the error. For example, block 254 may involve extracting an HTTP error code from the response message, and testing whether a flag associated with that error code has the value "TRUE" or an equivalent value. If error processing is not active for the current error code, then no further processing is done and control is passed to block 260.

However, if error processing is active for the current error code, then a source-and-destination bypass rule may be generated, as indicated by block 256. The source-and-destination bypass rule may be generated based on the source IP address and the destination IP address of the response message. The source-and-destination bypass rule means, in effect, "bypass all further traffic from this source and headed for this destination, because a prior message caused an error."

In block 258, address values associated with the source-and-destination bypass rule are stored in a source-and-destination bypass table, such as table 206. Thereafter, when the process of FIG. 2B is carried out, a subsequent message having the same source address and destination address will be bypassed.

Using this process, the proxy server may avoid clients and servers that persistently generate interception related errors. For example, in the context of the World Wide Web, assume that a requesting client, such as a browser at a remote machine, requests a Web page from origin server 124. Assume origin server 124 only gives documents to select clients based on their IP address, and refuses to give documents to all other hosts. For example origin server may respond with "403 Forbidden" errors to all other hosts. Because the proxy server obscures the true IP address of the client (the origin server gets a request from the proxy's IP address), the origin server returns a "403" error code. The proxy server may cause driver 120 to add a rule that directs the driver to start bypassing requests from that particular client and the origin server 124, which are identified in the error message.

Assume now that the client seeks the same Web page from the origin server 124 again, for example, by activating the "reload" function of the Web browser at the client. In response, because a bypass rule now exists, driver 120 will bypass the request, so that the error does not pass through the proxy processing engine 116 again.

Accordingly, a driver associated with a proxy server has the ability to dynamically detect servers or sites that cause errors, and effectively "blacklist" them as sites that need to be bypassed. As a result, the proxy server is more robust, resists various error conditions, and avoids problematic servers or servers that do not conform to a recognized protocol that the proxy server can handle.

Retrying Transactions

When the processing of a transaction creates a bypass rule, but no response has yet been delivered to the client, it is desirable to retry the failed transaction directly with the origin server, to obscure the failed transaction from the client.

In a preferred embodiment, delivery of response data to the client is suppressed until a bypass-generation determination can be made. When the determination is made to dynamically generate a bypass rule, the bypass rule is added normally, but additionally, in the case where the transaction is idempotent, a response is sent back to the client requesting the client to retry the transaction.

For example, in the HTTP protocol, the retry may be implemented by transmitting an HTTP "redirect" response message to the client, vectoring the client back to the same resource that was determined to require a bypass for correct operation. The client will subsequently retry the transaction, which then triggers a match in the bypass table. As a result, the traffic is bypassed to the origin server for processing, without the error being visible to the user.

The term "idempotent" means acting as if used only once, even if used multiple times. This term is often used with respect to header files of computer programs. If a header file is ever included twice during the same compilation, compilation errors can result unless the header file has protected itself against multiple inclusion; a header file so protected is said to be idempotent. The term can also be used to describe an initialization subroutine that is arranged to perform some critical action exactly once, even if the routine is called several times.

Rule Format and Syntax

As described above, bypass information may be created in the form of one or more rules that identify what traffic to bypass. The bypass rules may be stored in a configuration file 208.

A bypass rule that causes source address bypassing may be expressed in the form:

bypass src 207.200.75.104, 131.32.0.0–134.255.255.255, 209.171.17.0/24

In this rule, the word "bypass" identifies the line of text as a bypass rule. The word "src" identifies the rule as a source bypass rule. The value "207.200.75.104" indicates that any packet having a source IP address of "207.200.75.104" is to be bypassed. The value "131.32.0.0–134.255.255.255" indicates that any packet having a source IP address ranging from "131.32.0.0" through "134.255.255.255" should be bypassed. The value "209.171.17.0/24" indicates that any packet having a source IP address ranging from "209.171.17.0" through "209.171.17.255", inclusive, should be bypassed. This value is expressed in the Classless Inter-Domain Routing ("CIDR") format that is standard within the Internet.

The values "207.200.75.104," "131.32.0.0–134.255.255.255," and "209.171.17.0/24" are merely examples of values and shorthand formats that may be used to express values.

Similarly, a destination bypass rule may have the form:

bypass dst 209.1.23.32, 209.171.17.0–209.171.17.11

In this rule, the word "bypass" identifies the line of text as a bypass rule. The word "dst" identifies the rule as a destination bypass rule. The value "209.1.23.32" indicates that any packet having a source IP address of "209.1.23.32" is to be bypassed. The value "209.171.17.0–209.171.17.11" indicates that any packet having a source IP address ranging from "209.171.17.0" through "209.171.17.11 " should be bypassed.

A source-and-destination bypass rule may have the form:

bypass src 131.32.0.0 AND dst 209.171.17.11

In this rule, the word "bypass" identifies the line of text as a bypass rule. The word "AND" identifies the rule as a source-and-destination bypass rule. The word "src" followed by the value "131.32.0.0" and the word "dst" followed by the value "209.171.17.11" indicate that any packet also having a source IP address of "131.32.0.0" and a destination IP address of "209.171.17.11" should be bypassed.

Configuration file 208 may be structured as a list of one or more rules, each in the foregoing syntax. In the preferred embodiment, each of the rules in configuration file 208 is delimited by newline characters, and rules may have a maximum length of 512 characters. Further, the configuration file 208 may include lines that begin with a comment delimiter or token, such as "#". Such lines are taken as comments, and ignored when tables 202, 204, 206 are constructed from the contents of the configuration file, for example, in block 224 of FIG. 2A. An example of configuration file 208 is set forth in Table 1.

TABLE 1

Example Configuration File

This is a sample configuration file that has bypass rules.
   This # file will be read each time the proxy server restarts.
bypass src 12.2.43.43, 207.200.75.104, 131.32.0.0–134.255.255.255
bypass src 209.171.17.0 AND dst 209.171.17.11
bypass dst 210.1.1.0/24
bypass src 209.171.17.11 ttl 3600
bypass src 10.10.10.10

Rule Consolidation

In one embodiment, rule consolidation may be carried out. In rule consolidation, the tables 202, 204, 206 are periodically scanned, and duplicate entries are combined. Also, in embodiments that have more than one configuration file 208, the configuration files may be scanned periodically, and rules that reflect overlapping ranges of IP addresses may be consolidated into more efficient rules that do not overlap.

Rule Aging

In another embodiment, rule aging may be carried out. In rule aging, each entry in each table 202, 204, 206 is stored in association with a date stamp value or a time-to-live value. The tables 202, 204, 206 are scanned periodically, and old entries are deleted. In this context, "old entries" means entries that have a date stamp that is more than a predetermined time interval before the time at which the scanning is carried out.

Other Alternatives

Still other alternative embodiments are contemplated. For example, the mechanisms disclosed herein may be improved by adding more features that operate in the manner of a firewall, such as Access lists and Deny lists that are based on IP addresses.

"Phone Home" Rule Updating

In yet another embodiment, centralized rule updating may be carried out. In rule updating, a "master list" of bypass rules is stored in a master table at a central site, or distributed across multiple sites. The term "home" is used to represent the central server or distributed servers that house the master bypass list. The term "phones" is used symbolically to mean that communication is established among two elements, however, literally telephoning is not required.

Periodically, each proxy processing engine 116 that is connected to the network 106 "phones home", contacting the "home" and downloads a configuration file 208 that contains the master bypass rules. Each proxy processing engine 116 then loads the configuration file 208 and rebuilds its bypass tables 202, 204, 206, or appends the addresses defined in the configuration file to its bypass tables.

Periodically, at a same or different interval, each proxy processing engine 116 that is connected to the network 106 "phones home", contacting the "home" and uploads portions of the current local bypass tables and system statistics to the "home". The home then coalesces bypass knowledge and system statistics from the calling nodes, along with centralized information, to create a master bypass list, containing bypass knowledge accumulated from multiple, network-dispersed proxy servers. This allows the proxies to more quickly converge on adaptive bypass lists.

The master bypass list provides an easy and scalable means to accelerate adaptive learning, and to share lists of clients and servers that wish to opt out of transparent proxying. Large collections of proxies scattered around the globe, and managed by different administrative organizations can stay synchronized on bypass lists without need for human coordination.

Non-Historic Bypassing

In the foregoing description, driver 120 bypasses the proxy processing engine 116 in response to historic factors (for example, when a previous transaction with the same source-destination pair caused an error). However, driver 120 may be further configured to bypass proxy processing engine 116 based on instantaneous and environmental factors. Thus, even though no bypass rule exists that would require a particular message to bypass the proxy processing engine 116, upon detecting certain environmental conditions, driver 120 may nevertheless decide that proxy processing engine 116 should be bypassed.

Driver 120 may take into account any number and combination of instantaneous and environmental factors when determining whether or not to bypass proxy processing engine 116 with a current request. By way of example, and not limitation, factors that driver 120 may take into account include whether (a) the proxy is malfunctioning, (b) the proxy is overloaded, (c) the system is under attack, (d) the current request is unsupported, (e) the request has known errors, and (f), the proxy is known to offer no value to the particular request. Each of these factors is now discussed.

Environmental Conditions (a) The mechanisms disclosed herein may be used to make the proxy processing engine 116 fault tolerant. For example, the proxy processing engine 116 generates periodic "heartbeat" messages to the driver 120. If the driver 120 fails to receive a "heartbeat" message over a pre-determined interval of time, the driver assumes that the proxy processing engine 116 is unavailable or has crashed. In response, driver 120 causes all traffic to be bypassed until the proxy processing engine 116 comes back on-line. The driver may also monitor system resources, such as process identifiers, process semaphores, and open connections to detect system failure. Additionally, if the proxy server has failed repeatedly several times in close proximity, the driver will persistently bypass traffic away from the proxy server, even after heartbeats resume, as a fail-safe measure so a failing proxy server will not cause the system to "flap". Furthermore, the driver can buffer and retry entire requests periodically to cover proxy or origin server failures.

(b) With respect to overload conditions, the when the proxy processing engine 116 detects heavy loading, it directs driver 120 to start bypassing part of the network traffic directed at the proxy server. Accordingly, overload conditions are handled gracefully. Overloading is detected by monitoring such metrics as CPU utilization, concurrent connections, disk queue length, mean transaction latency, and user transaction abort percentage. These metrics are meant to be exemplary, but not exhaustive. An overload condition is inferred if any of the metrics exceed predetermined or historical tolerances. When overload occurs, bypassing can be enabled to shed load and reduce the overload condition. In one embodiment, statistical bypassing is used in a closed loop, where the degree of the overload affects the degree of the statistical bypass.

(c) Similar to overload detection, attack detection may be heuristically identified by examining system metrics and compare them to normal tolerances. Metrics include the frequency of packets sent to or from a particular destination, connections opened to or from a destination, listen queue length, errors per unit time, and overall system performance. When an attack is inferred from a particular client, a source bypass rule is enabled for that client. If system errors or overload is occurring as a result of an attack, load is statistically bypassed, up to 100%, where no traffic is sent to the proxy server.

Transactional Conditions

The previous three conditions are environmental. There are also transaction-based stimuli for bypass. Transaction-based conditions are assessed by processing enough of a transaction to make a bypass determination, and then applying the bypass determination to the remainder of the transaction.

For example, the driver 120 can answer an intercepted TCP connection request (masquerading as the origin server), and then receive the request data. Enough of the request data is consumed and processed by the driver to make a bypass determination.

If the decision is made not to bypass, the consumed data is replayed to the proxy server, and the remaining unconsumed bytes will be sent to the proxy server as they arrive, as in the normal interception case.

If the decision is made to bypass, the consumed data is replayed to the bypass target, and the remaining, unconsumed bytes will be bypassed as in the normal bypass case.

Note that the essence of the method is that some of the data must be consumed and buffered by the driver before a bypass determination can be made. The buffering is essential do that the consumed data can be relayed on to the eventual destination.

(d) Using the aforementioned technique, unsupported requests, such as unknown or unimplemented HTTP methods or unsupported headers, can be detected by the driver, and bypassed to the origin server, without ever reaching the proxy server.

(e) Similarly, suspected problematic traffic, say coming from suspect User Agents or involving erroneous or out-of-spec input syntax, can be vectored harmlessly away from the proxy server, to the origin server.

(f) Some requests may be well-formed and processable by the proxy server, but the proxy server would provide no value, or an identity operation. For example, a caching proxy server may prefer not to process requests for uncachable objects, because little value may be gained. In such situations, the method, object, and headers of a request can be examined to access the value of the proxy application to the request, and if the value is absent, the driver can vector the request to the origin server, saving resources, and eliminating unnecessary delay. As a specific example, a driver supporting a caching HTTP proxy server might scan the request method and URL for cachability, making bypass decisions on the result.

Hardware Overview

Figure 3:
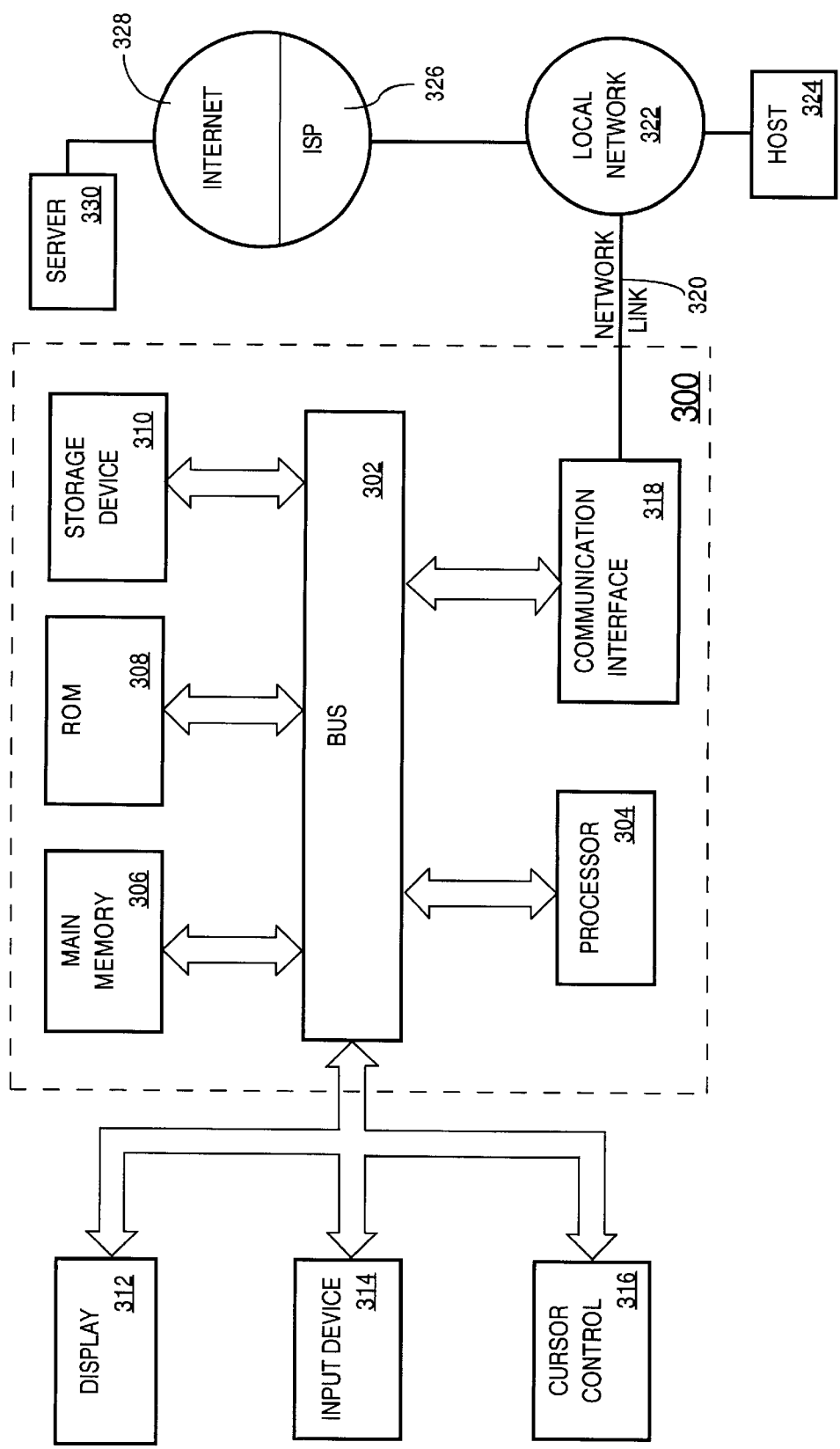
FIG. 3 is a block diagram that illustrates a computer system upon which an embodiment may be implemented.

FIG. 3 is a block diagram that illustrates a computer system 300 upon which an embodiment may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for bypassing network traffic. According to one embodiment, bypassing network traffic is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for bypassing network traffic as described herein.

The received code may be executed by processor 304 as it is received, and/or stored in storage device 310, or other non-volatile storage for later execution. In this manner, computer system 300 may obtain application code in the form of a carrier wave.

In this disclosure, the invention is described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a system that routes requests for information destined for an origin server via an interception device, and redirects the intercepted requests for information to a proxy processing engine that participates in processing the requests for information, a method of routing the requests for information comprising the steps of:

receiving feature information identifying one or more features of a current transaction or environment;

selecting a bypass percentage value based on the values of system parameters and tolerances;

generating a pseudo-random value using a pseudo-random number generator;

selectively bypassing the proxy processing engine for a particular request for information so that the proxy processing engine does not participate in the processing of the particular request for information;

wherein the selective bypassing of the proxy processing engine is based upon the feature information and environmental information and whether the pseudo-random value is less than the bypass percentage; and redirecting the particular request for information to the origin server.

2. The method recited in claim 1, further comprising selectively bypassing the proxy processing engine for the particular request for information when network source address information contained in the particular request for information matches source patterns in a bypass table.

3. The method recited in claim 1, further comprising selectively bypassing the proxy processing engine for the particular request for information when network destination address information contained in the particular request for information matches destination patterns in a bypass table.

4. The method recited in claim 1, further comprising selectively bypassing the proxy processing engine for the particular request for information when a composition of network source and destination address information contained in the particular request for information matches patterns in a bypass table.

5. The method recited in claim 3, further comprising creating and storing entries in the bypass table that describe ranges of source and destination network addresses and port numbers.

6. The method recited in claim 5, further comprising creating and storing, in association with the entries in the bypass table, time-to-live values that limit the effective lifetime of applicability of each entry.

7. The method recited in claim 6, further comprising modifying the bypass tables dynamically, to add, delete, or modify bypass rules, while carrying out the steps of selectively bypassing and redirecting.

8. The method recited in claim 7, further comprising dynamically loading and activating pre-determined bypass tables.

9. The method recited in claim 8, further comprising modifying the bypass tables adaptively and automatically based on network activity and environmental conditions.

10. The method recited in claim 9, further comprising adding new bypass rules when the proxy processing engine receives protocol request or response errors to the processing of the intercepted requests for information to avoid erroneous transactions in the future.

11. The method recited in claim 10, further comprising the steps of:

storing, in association with the proxy processing engine, a plurality of bypass activation flags, one of each associated with various error conditions, wherein each of the flags is associated with a different error condition that may occur in the processing of an intercepted request for information; and detecting a particular error condition associated with the processing of the particular request for information, and augmenting the bypass table to prevent future interception of protocol traffic from a client destined for the origin server, when the flag associated with that particular error condition is set.

12. The method recited in claim 11, further comprising the steps of augmenting the bypass table by addition of a source-destination bypass rule that prevents intercept processing of protocol traffic from a particular client network address destined for a particular origin server network address.

13. The method recited in claim 1, further comprising the steps of creating and storing one or more bypass rules for use in augmenting a bypass table in response to receiving one or more packets that conform to one or more protocols that are not supported by the proxy processing engine.

14. The method recited in claim 1, further comprising the steps of creating and storing one or more bypass rules for use in augmenting a bypass table in response to receiving erroneous or unsupported requests for information from a client.

15. The method recited in claim 1, further comprising the steps of creating and storing one or more bypass rules for use in augmenting a bypass table in response to receiving an error message from the origin server that indicates refusal or inability to correctly respond to the particular request for information.

16. The method recited in claim 1, further comprising the steps of:

determining whether one or more system metrics are outside normal tolerances;

inferring that either the origin server or a node on which the proxy processing engine is disposed is under attack when one or more of the system metrics are outside normal tolerances; and creating and storing one or more bypass rules for use in augmenting a bypass table and that bypass one or more requests for information associated with the attack in response to determining that either the origin server or the node on which the proxy processing engine is disposed is under attack.

17. The method recited in claim 16, wherein determining whether one or more system metrics are outside normal tolerances includes measuring one or more system metrics selected from among: the frequency of packets sent to or from a particular destination, connections opened to or from a destination, listen queue length, errors per unit time, and overall system performance.

18. The method recited in claim 1, further comprising the steps of creating and storing one or more bypass rules for use in augmenting a bypass table in response to detecting a persistent failure of either the origin server or the node on which the proxy processing engine is disposed.

19. The method recited in claim 1, further comprising the steps of determining that at least a portion of the particular request for information is presented in a foreign, malformed, or unprocessable protocol, and in response thereto, sending the network information to the origin server in the network, thereby bypassing the proxy processing engine.

20. The method recited in claim 1, further comprising the steps of:
inferring that the origin server uses client address identification to parameterize the processing of a transaction, through examination of protocol request and response data; and
in response thereto, bypassing the particular request for information to the origin server in the network, thereby bypassing the proxy processing engine and preserving an original client address in the particular request for information.

21. The method recited in claim 20, further comprising the steps of inferring that the origin server uses client address information to parameterize the processing of a transaction by the presence of particular transaction response codes, including codes that indicate forbidden access and missing content.

22. The method recited in claim 1, further comprising the steps of determining that a redirection target identified in the particular request for information is overloaded, and in response thereto, directing the particular request for information to the origin server in the network to prevent overload of the redirection target.

23. The method recited in claim 1, further comprising the steps of:
creating and storing one or more lists of servers that do not interact well with the proxy processing engine;
determining that the particular request for information identifies one of the servers in one of the lists of servers;
in response thereto, directing the particular request for information to the origin server in the network and away from the proxy processing engine.

24. The method recited in claim 1, further comprising the steps of determining that the particular request for information relates to a transaction that will not benefit from redirection to the proxy processing engine and in response thereto, directing the particular request for information to the origin server in the network and away from the proxy processing engine.

25. The method recited in claim 24, further comprising the steps of determining that the particular request for information relates to a transaction that will not benefit from redirection to the proxy processing engine based on examination of transaction type and resource identifying information from the the particular request for information.

26. The method recited in claim 25, further comprising the steps of:
extracting a transaction request type, resource identifying information, and additional request attribute information from the particular request for information; and
generating instructions that cause bypassing of the proxy processing engine when the transaction request type is not supported, or the transaction request type gains no benefit from a caching or proxy server, or the resource identifying information contains syntactic patterns suggesting lack of cachability, or the additional request attributes suggest lack of cachability.

27. The method recited in claim 25, further comprising the steps of:
exchanging one or more packets among the proxy processing engine and a client to sufficiently establish a communication channel in order to receive enough transaction request data to make a bypass determination; and
if a bypass determination is made, establishing a new connection to the origin server, replaying consumed data and forwarding remaining data to the origin server, rewriting packet addresses and headers as necessary, to provide a complete and proper bypassed data stream to the origin server.

28. The method recited in claim 1, further comprising periodically uploading bypass tables to a centralized server, thereby aggregating adaptive bypass information from individual, distributed servers.

29. The method recited in claim 1, further comprising periodically downloading predetermined bypass tables from centralized servers in the network, replacing or augmenting a current local bypass list, thereby sharing and disseminated centralized, professionally managed, or aggregated bypass information.

30. The method recited in claim 11, further comprising the steps of:
suppressing client response data until a bypass generation determination is made; and
when a bypass rule is generated, and when a client-server transaction is deemed important issuing a transaction retry request to the client, whereby the client retries the transaction, the retried transaction matches the bypass list, and the transaction is vectored to the origin server for correct processing.

31. A computer-readable medium carrying one or more sequences of instructions which, when executed by one or more processors, cause the one or more processors to route requests for information destined for an origin server via an interception device by:
receiving feature information identifying one or more features of a current transaction or environment;
selecting a bypass percentage value based on the values of system parameters and tolerances;
generating a pseudo-random value using a pseudo-random number generator;
selectively bypassing a proxy processing engine for a particular request for information so that the proxy processing engine does not participate in the processing of the particular request for information;
wherein the selective bypassing of the proxy processing engine is based upon the feature information and environmental information and whether the pseudo-random value is less than the bypass percentage; and
redirecting the particular request for information to the origin server.

32. The computer-readable medium recited in claim 31, further comprising one or more sequences of additional instructions which, when executed by the one or more processors, cause the one or more processors to perform the steps of selectively bypassing the proxy processing engine for the particular request for information when network source address information contained in the particular request for information matches source patterns in a bypass table.

33. The computer-readable medium recited in claim 31, further comprising one or more sequences of additional instructions which, when executed by the one or more processors, cause the one or more processors to perform the steps of selectively bypassing the proxy processing engine for the particular request for information when network destination address information contained in the particular request for information matches destination patterns in a bypass table.

34. The computer-readable medium recited in claim 31, further comprising one or more sequences of additional instructions which, when executed by the one or more processors, cause the one or more processors to perform the steps of selectively bypassing the proxy processing engine for the particular request for information when a composition of network source and destination address information contained in the particular request for information matches patterns in a bypass table.

35. The computer-readable medium recited in claim 33, further comprising one or more sequences of additional instructions which, when executed by the one or more processors, cause the one or more processors to perform the steps of creating and storing entries in the bypass table that describe ranges of source and destination network addresses and port numbers.

36. The computer-readable medium recited in claim 35, further comprising one or more sequences of additional instructions which, when executed by the one or more processors, cause the one or more processors to perform the steps of creating and storing, in association with the entries in the bypass table, time-to-live values that limit the effective lifetime of applicability of each entry.

37. The computer-readable medium recited in claim 36, further comprising one or more sequences of additional instructions which, when executed by the one or more processors, cause the one or more processors to perform the steps of modifying the bypass tables dynamically, to add, delete, or modify bypass rules, while carrying out the steps of selectively bypassing and redirecting.

38. The computer-readable medium recited in claim 37, further comprising one or more sequences of additional instructions which, when executed by the one or more processors, cause the one or more processors to perform the steps of dynamically loading and activating pre-determined bypass tables.

39. The computer-readable medium recited in claim 38, further comprising one or more sequences of additional instructions which, when executed by the one or more processors, cause the one or more processors to perform the steps of modifying the bypass tables adaptively and automatically based on network activity and environmental conditions.

40. The computer-readable medium recited in claim 39, further comprising one or more sequences of additional instructions which, when executed by the one or more processors, cause the one or more processors to perform the steps of adding new bypass rules when the proxy processing engine receives protocol request or response errors to the processing of the intercepted requests for information to avoid erroneous transactions in the future.

41. The computer-readable medium recited in claim 40, further comprising one or more sequences of additional instructions which, when executed by the one or more processors, cause the one or more processors to perform the steps of the steps of:
  storing, in association with the proxy processing engine, a plurality of bypass activation flags, one of each associated with various error conditions, wherein each of the flags is associated with a different error condition that may occur in the processing of an intercepted request for information; and
  detecting a particular error condition associated with the processing of the particular request for information, and augmenting the bypass table to prevent future interception of protocol traffic from a client destined for the origin server, when the flag associated with that particular error condition is set.

42. The computer-readable medium recited in claim 41, further comprising one or more sequences of additional instructions which, when executed by the one or more processors, cause the one or more processors to perform the steps of the steps of augmenting the bypass table by addition of a source-destination bypass rule that prevents intercept processing of protocol traffic from a particular client network address destined for a particular origin server network address.

43. The computer-readable medium recited in claim 31, further comprising one or more sequences of additional instructions which, when executed by the one or more processors, cause the one or more processors to perform the steps of the steps of creating and storing one or more bypass rules for use in augmenting a bypass table in response to receiving one or more packets that conform to one or more protocols that are not supported by the proxy processing engine.

44. The computer-readable medium recited in claim 31, further comprising one or more sequences of additional instructions which, when executed by the one or more processors, cause the one or more processors to perform the steps of the steps of creating and storing one or more bypass rules for use in augmenting a bypass table in response to receiving erroneous or unsupported requests for information from a client.

45. The computer-readable medium recited in claim 31, further comprising one or more sequences of additional instructions which, when executed by the one or more processors, cause the one or more processors to perform the steps of the steps of creating and storing one or more bypass rules for use in augmenting a bypass table in response to receiving an error message from the origin server that indicates refusal or inability to correctly respond to the particular request for information.

46. The computer-readable medium recited in claim 31, further comprising one or more sequences of additional instructions which, when executed by the one or more processors, cause the one or more processors to perform the steps of the steps of:
  determining whether one or more system metrics are outside normal tolerances;
  inferring that either the origin server or a node on which the proxy processing engine is disposed is under attack when one or more of the system metrics are outside normal tolerances; and
  creating and storing one or more bypass rules for use in augmenting a bypass table and that bypass one or more requests for information associated with the attack in response to determining that either the origin server or the node on which the proxy processing engine is disposed is under attack.

47. The computer-readable medium recited in claim 46, wherein determining whether one or more system metrics are outside normal tolerances includes measuring one or more system metrics selected from among: the frequency of packets sent to or from a particular destination, connections opened to or from a destination, listen queue length, errors per unit time, and overall system performance.

48. The computer-readable medium recited in claim 31, further comprising one or more sequences of additional instructions which, when executed by the one or more processors, cause the one or more processors to perform the steps of the steps of creating and storing one or more bypass rules for use in augmenting a bypass table in response to detecting a persistent failure of either the origin server or the node on which the proxy processing engine is disposed.

49. The computer-readable medium recited in claim 31, further comprising one or more sequences of additional instructions which, when executed by the one or more processors, cause the one or more processors to perform the steps of the steps of determining that at least a portion of the particular request for information is presented in a foreign, malformed, or unprocessable protocol, and in response thereto, sending the network information to the origin server in the network, thereby bypassing the proxy processing engine.

50. The computer-readable medium recited in claim 31, further comprising one or more sequences of additional instructions which, when executed by the one or more processors, cause the one or more processors to perform the steps of the steps of:

inferring that the origin server uses client address identification to parameterize the processing of a transaction, through examination of protocol request and response data; and in response thereto, bypassing the particular request for information to the origin server in the network, thereby bypassing the proxy processing engine and preserving an original client address in the particular request for information.

51. The computer-readable medium recited in claim 50, further comprising one or more sequences of additional instructions which, when executed by the one or more processors, cause the one or more processors to perform the steps of the steps of inferring that the origin server uses client address information to parameterize the processing of a transaction by the presence of particular transaction response codes, including codes that indicate forbidden access and missing content.

52. The computer-readable medium recited in claim 31, further comprising one or more sequences of additional instructions which, when executed by the one or more processors, cause the one or more processors to perform the steps of the steps of determining that a redirection target identified in the particular request for information is overloaded, and in response thereto, directing the particular request for information to the origin server in the network to prevent overload of the redirection target.

53. The computer-readable medium recited in claim 31, further comprising one or more sequences of additional instructions which, when executed by the one or more processors, cause the one or more processors to perform the steps of the steps of:

creating and storing one or more lists of servers that do not interact well with the proxy processing engine;

determining that the particular request for information identifies one of the servers in one of the lists of servers;

in response thereto, directing the particular request for information to the origin server in the network and away from the proxy processing engine.

54. The computer-readable medium recited in claim 31, further comprising one or more sequences of additional instructions which, when executed by the one or more processors, cause the one or more processors to perform the steps of the steps of determining that the particular request for information relates to a transaction that will not benefit from redirection to the proxy processing engine and in response thereto, directing the particular request for information to the origin server in the network and away from the proxy processing engine.

55. The computer-readable medium recited in claim 54, further comprising the steps of determining that the particular request for information relates to a transaction that will not benefit from redirection to the proxy processing engine based on examination of transaction type and resource identifying information from the particular request for information.

56. The computer-readable medium recited in claim 55, further comprising one or more sequences of additional instructions which, when executed by the one or more processors, cause the one or more processors to perform the steps of the steps of:

extracting a transaction request type, resource identifying information, and additional request attribute information from the particular request for information; and generating instructions that cause bypassing of the proxy processing engine when the transaction request type is not supported, or the transaction request type gains no benefit from a caching or proxy server, or the resource identifying information contains syntactic patterns suggesting lack of cachability, or the additional request attributes suggest lack of cachability.

57. The computer-readable medium recited in claim 55, further comprising one or more sequences of additional instructions which, when executed by the one or more processors, cause the one or more processors to perform the steps of the steps of:

exchanging one or more packets among the proxy processing engine and a client to sufficiently establish a communication channel in order to receive enough transaction request data to make a bypass determination; and if a bypass determination is made, establishing a new connection to the origin server, replaying consumed data and forwarding remaining data to the origin server, rewriting packet addresses and headers as necessary, to provide a complete and proper bypassed data stream to the origin server.

58. The computer-readable medium recited in claim 31, further comprising one or more sequences of additional instructions which, when executed by the one or more processors, cause the one or more processors to perform the steps of periodically uploading bypass tables to a centralized server, thereby aggregating adaptive bypass information from individual, distributed servers.

59. The computer-readable medium recited in claim 31, further comprising one or more sequences of additional instructions which, when executed by the one or more processors, cause the one or more processors to perform the steps of periodically downloading predetermined bypass tables from centralized servers in the network, replacing or augmenting the current local bypass list, thereby sharing and disseminated centralized, professionally managed, or aggregated bypass information.

60. The computer-readable medium recited in claim 31, further comprising one or more sequences of additional instructions which, when executed by the one or more processors, cause the one or more processors to perform the steps of the steps of:

suppressing client response data until a bypass generation determination is made; and when a bypass rule is generated, and when a client-server transaction is deemed important issuing a transaction retry request to the client, whereby the client retries the transaction, the retried transaction matches a bypass list, and the transaction is vectored to the origin server for correct processing.

61. An apparatus comprising a memory carrying one or more sequences of instructions which, when executed by one or more processors, cause the one or more processors to route requests for information destined for an origin server via an interception device by:
receiving feature information identifying one or more features of a current transaction or environment;
selecting a bypass percentage value based on the values of system parameters and tolerances;
generating a pseudo-random value using a pseudo-random number generator;
selectively bypassing a proxy processing engine for a particular request for information so that the proxy processing engine does not participate in the processing of the particular request for information;
wherein the selective bypassing of the proxy processing engine is based upon the feature information and environmental information and whether the pseudo-random value is less than the bypass percentage; and
redirecting the particular request for information to the origin server.

62. The apparatus recited in claim 61, the memory carrying one or more sequences of additional instructions which, when executed by the one or more processors, cause the one or more processors to perform the steps of selectively bypassing the proxy processing engine for the particular request for information when network source address information contained in the particular request for information matches source patterns in a bypass table.

63. The apparatus recited in claim 61, the memory carrying one or more sequences of additional instructions which, when executed by the one or more processors, cause the one or more processors to perform the steps of selectively bypassing the proxy processing engine for the particular request for information when network destination address information contained in the particular request for information matches destination patterns in a bypass table.

64. The apparatus recited in claim 61, the memory carrying one or more sequences of additional instructions which, when executed by the one or more processors, cause the one or more processors to perform the steps of selectively bypassing the proxy processing engine for the particular request for information when a composition of network source and destination address information contained in the particular request for information matches patterns in a bypass table.

65. The apparatus recited in claim 63, the memory carrying one or more sequences of additional instructions which, when executed by the one or more processors, cause the one or more processors to perform the steps of creating and storing entries in the bypass table that describe ranges of source and destination network addresses and port numbers.

66. The apparatus recited in claim 65, the memory carrying one or more sequences of additional instructions which, when executed by the one or more processors, cause the one or more processors to perform the steps of creating and storing, in association with the entries in the bypass table, time-to-live values that limit the effective lifetime of applicability of each entry.

67. The apparatus recited in claim 66, the memory carrying one or more sequences of additional instructions which, when executed by the one or more processors, cause the one or more processors to perform the steps of modifying the bypass tables dynamically, to add, delete, or modify bypass rules, while carrying out the steps of selectively bypassing and redirecting.

68. The apparatus recited in claim 67, the memory carrying one or more sequences of additional instructions which, when executed by the one or more processors, cause the one or more processors to perform the steps of dynamically loading and activating pre-determined bypass tables.

69. The apparatus recited in claim 68, the memory carrying one or more sequences of additional instructions which, when executed by the one or more processors, cause the one or more processors to perform the steps of modifying the bypass tables adaptively and automatically based on network activity and environmental conditions.

70. The apparatus recited in claim 69, the memory carrying one or more sequences of additional instructions which, when executed by the one or more processors, cause the one or more processors to perform the steps of adding new bypass rules when the proxy processing engine receives protocol request or response errors to the processing of the intercepted requests for information to avoid erroneous transactions in the future.

71. The apparatus recited in claim 70, the memory carrying one or more sequences of additional instructions which, when executed by the one or more processors, cause the one or more processors to perform the steps of the steps of:
storing, in association with the proxy processing engine, a plurality of bypass activation flags, one of each associated with various error conditions, wherein each of the flags is associated with a different error condition that may occur in the processing of an intercepted request for information; and
detecting a particular error condition associated with the processing of the particular request for information, and augmenting the bypass table to prevent future interception of protocol traffic from a client destined for the origin server, when the flag associated with that particular error condition is set.

72. The apparatus recited in claim 71, the memory carrying one or more sequences of additional instructions which, when executed by the one or more processors, cause the one or more processors to perform the steps of the steps of augmenting the bypass table by addition of a source-destination bypass rule that prevents intercept processing of protocol traffic from a particular client network address destined for a particular origin server network address.

73. The apparatus recited in claim 61, the memory carrying one or more sequences of additional instructions which, when executed by the one or more processors, cause the one or more processors to perform the steps of the steps of creating and storing one or more bypass rules for use in augmenting a bypass table in response to receiving one or more packets that conform to one or more protocols that are not supported by the proxy processing engine.

74. The apparatus recited in claim 61, the memory carrying one or more sequences of additional instructions which, when executed by the one or more processors, cause the one or more processors to perform the steps of the steps of creating and storing one or more bypass rules for use in augmenting a bypass table in response to receiving erroneous or unsupported requests for information from a client.

75. The apparatus recited in claim 61, the memory carrying one or more sequences of additional instructions which, when executed by the one or more processors, cause the one or more processors to perform the steps of the steps of creating and storing one or more bypass rules for use in augmenting a bypass table in response to receiving an error message from the origin server that indicates refusal or inability to correctly respond to the particular request for information.

76. The apparatus recited in claim 61, the memory carrying one or more sequences of additional instructions which, when executed by the one or more processors, cause the one or more processors to perform the steps of the steps of:

- determining whether one or more system metrics are outside normal tolerances;
- inferring that either the origin server or a node on which the proxy processing engine is disposed is under attack when one or more of the system metrics are outside normal tolerances; and
- creating and storing one or more bypass rules for use in augmenting a bypass table and that bypass one or more requests for information associated with the attack in response to determining that either the origin server or the node on which the proxy processing engine is disposed is under attack.

77. The apparatus recited in claim 76, wherein determining whether one or more system metrics are outside normal tolerances includes measuring one or more system metrics selected from among: the frequency of packets sent to or from a particular destination, connections opened to or from a destination, listen queue length, errors per unit time, and overall system performance.

78. The apparatus recited in claim 61, the memory carrying one or more sequences of additional instructions which, when executed by the one or more processors, cause the one or more processors to perform the steps of the steps of creating and storing one or more bypass rules for use in augmenting a bypass table in response to detecting a persistent failure of either the origin server or the node on which the proxy processing engine is disposed.

79. The apparatus recited in claim 61, the memory carrying one or more sequences of additional instructions which, when executed by the one or more processors, cause the one or more processors to perform the steps of the steps of determining that at least a portion of the particular request for information is presented in a foreign, malformed, or unprocessable protocol, and in response thereto, sending the network information to the origin server in the network, thereby bypassing the proxy processing engine.

80. The apparatus recited in claim 61, the memory carrying one or more sequences of additional instructions which, when executed by the one or more processors, cause the one or more processors to perform the steps of the steps of:

- inferring that the origin server uses client address identification to parameterize the processing of a transaction, through examination of protocol request and response data; and
- in response thereto, bypassing the particular request for information to the origin server in the network, thereby bypassing the proxy processing engine and preserving an original client address in the particular request for information.

81. The apparatus recited in claim 80, the memory carrying one or more sequences of additional instructions which, when executed by the one or more processors, cause the one or more processors to perform the steps of the steps of inferring that the origin server uses client address information to parameterize the processing of a transaction by the presence of particular transaction response codes, including codes that indicate forbidden access and missing content.

82. The apparatus recited in claim 61, the memory carrying one or more sequences of additional instructions which, when executed by the one or more processors, cause the one or more processors to perform the steps of the steps of determining that a redirection target identified in the particular request for information is overloaded, and in response thereto, directing the particular request for information to the origin server in the network to prevent overload of the redirection target.

83. The apparatus recited in claim 61, the memory carrying one or more sequences of additional instructions which, when executed by the one or more processors, cause the one or more processors to perform the steps of the steps of:

- creating and storing one or more lists of servers that do not interact well with the proxy processing engine;
- determining that the particular request for information identifies one of the servers in one of the lists of servers;
- in response thereto, directing the particular request for information to the origin server in the network and away from the proxy processing engine.

84. The apparatus recited in claim 61, the memory carrying one or more sequences of additional instructions which, when executed by the one or more processors, cause the one or more processors to perform the steps of the steps of determining that the particular request for information relates to a transaction that will not benefit from redirection to the proxy processing engine and in response thereto, directing the particular request for information to the origin server in the network and away from the proxy processing engine.

85. The apparatus recited in claim 84, the memory carrying the steps of determining that the particular request for information relates to a transaction that will not benefit from redirection to the proxy processing engine based on examination of transaction type and resource identifying information from the particular request for information.

86. The apparatus recited in claim 85, the memory carrying one or more sequences of additional instructions which, when executed by the one or more processors, cause the one or more processors to perform the steps of the steps of:

- extracting a transaction request type, resource identifying information, and additional request attribute information from the particular request for information; and
- generating instructions that cause bypassing of the proxy processing engine when the transaction request type is not supported, or the transaction request type gains no benefit from a caching or proxy server, or the resource identifying information contains syntactic patterns suggesting lack of cachability, or the additional request attributes suggest lack of cachability.

87. The apparatus recited in claim 85, the memory carrying one or more sequences of additional instructions which, when executed by the one or more processors, cause the one or more processors to perform the steps of the steps of:

- exchanging one or more packets among the proxy processing engine and a client to sufficiently establish a communication channel in order to receive enough transaction request data to make a bypass determination; and if a bypass determination is made, establishing a new connection to the origin server, replaying consumed data and forwarding remaining data to the origin server, rewriting packet addresses and headers as necessary, to provide a complete and proper bypassed data stream to the origin server.

88. The apparatus recited in claim 61, the memory carrying one or more sequences of additional instructions which, when executed by the one or more processors, cause the one or more processors to perform the steps of periodically uploading bypass tables to a centralized server, thereby aggregating adaptive bypass information from individual, distributed servers.

89. The apparatus recited in claim 61, the memory carrying one or more sequences of additional instructions which, when executed by the one or more processors, cause the one or more processors to perform the steps of periodically downloading predetermined bypass tables from centralized servers in the network, replacing or augmenting the current local bypass list, thereby sharing and disseminated centralized, professionally managed, or aggregated bypass information.

90. The apparatus recited in claim 61, the memory carrying one or more sequences of additional instructions which, when executed by the one or more processors, cause the one or more processors to perform the steps of the steps of:

suppressing client response data until a bypass generation determination is made; and when a bypass rule is generated, and when a client-server transaction is deemed important issuing a transaction retry request to the client, whereby the client retries the transaction, the retried transaction matches a bypass list, and the transaction is vectored to the origin server for correct processing.

\* \* \* \* \*